US006856356B1

(12) United States Patent
Kahn

(10) Patent No.: US 6,856,356 B1
(45) Date of Patent: Feb. 15, 2005

(54) STROBE FLASH PHOTOGRAPHIC ILLUMINATION

(75) Inventor: Richard Oliver Kahn, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 957 days.

(21) Appl. No.: 09/592,944

(22) Filed: Jun. 13, 2000

(30) Foreign Application Priority Data

Jun. 15, 1999 (EP) ............................................. 99304656

(51) Int. Cl.⁷ ............................................ H04N 5/222
(52) U.S. Cl. ...................................... 348/371; 348/370
(58) Field of Search ................................ 348/370, 371, 348/373, 131, 132, 144, 262, 275, 61, 296, 138, 68, 376; 382/154; 396/179, 161, 159, 431; 250/330

(56) References Cited

U.S. PATENT DOCUMENTS

| | | | | |
|---|---|---|---|---|
| 3,659,509 A | * | 5/1972 | Burgarella | .................... 396/61 |
| 3,946,271 A | | 3/1976 | Stepp et al. | |
| 3,953,763 A | | 4/1976 | Herrick | |
| 4,007,399 A | | 2/1977 | White | |
| 4,405,889 A | | 9/1983 | Overstreet et al. | |
| 4,449,804 A | | 5/1984 | Watanabe et al. | |
| 4,477,796 A | | 10/1984 | Kearsley | |
| 4,567,506 A | * | 1/1986 | Shinoda et al. | ............. 348/132 |
| 4,608,522 A | | 8/1986 | Yuasa et al. | |
| 4,667,255 A | * | 5/1987 | Lindberg | .................... 358/497 |
| 4,738,526 A | | 4/1988 | Larish | |
| 5,168,364 A | * | 12/1992 | Kondo et al. | ............ 348/230.1 |
| 5,305,049 A | * | 4/1994 | Miyazaki et al. | ............. 396/63 |
| 5,347,200 A | | 9/1994 | De Nardis | |
| 5,539,456 A | * | 7/1996 | Ishii | ......................... 348/224.1 |
| 5,546,121 A | | 8/1996 | Gotanda et al. | |
| 5,655,170 A | | 8/1997 | Yamamoto et al. | |
| 5,809,350 A | * | 9/1998 | Fukui | ......................... 396/166 |
| 5,881,326 A | * | 3/1999 | Sakamoto | .................... 396/161 |
| 5,920,342 A | * | 7/1999 | Umeda et al. | .......... 348/211.14 |
| 6,115,068 A | * | 9/2000 | Ariga et al. | ................. 348/373 |
| 2002/0126890 A1 | * | 9/2002 | Katayama et al. | ........... 382/154 |

FOREIGN PATENT DOCUMENTS

JP    03024529 A    *    2/1991    ............ G03B/7/16

OTHER PUBLICATIONS

"Stroboscope Light". *Elektor Electronics* No. 221. Apr. 20, 1994, Dorchester, Great Britain. pp. 62–66.

* cited by examiner

*Primary Examiner*—Aung Moe

(57) ABSTRACT

The present invention relates to a camera (102) with strobe flash illumination (116) for capturing an image of an object (6), and to a document scanning system (101) and method of using such a camera (102) to capture an image of a document (6). The camera (102) comprises an image capture means, an objective lens (114) with a field of view (118) to image optical radiation (119) from an object plane (8) onto the image capture means (52), a strobe flash (116) for illuminating the object plane (8), electronic pulse circuitry to pulse the strobe flash (116) at a rate which is sufficiently quick that the illumination appears to a user of the camera (102) to be substantially steady owing to persistence of vision, and a shutter means (104) to synchronize the capture of one or more images by the image capture means, each image being captured with at least one pulse from the strobe flash. The shutter means (104) is adapted to capture images at a rate substantially below the rate at which the strobe flash (16, 116) is pulsed.

18 Claims, 4 Drawing Sheets

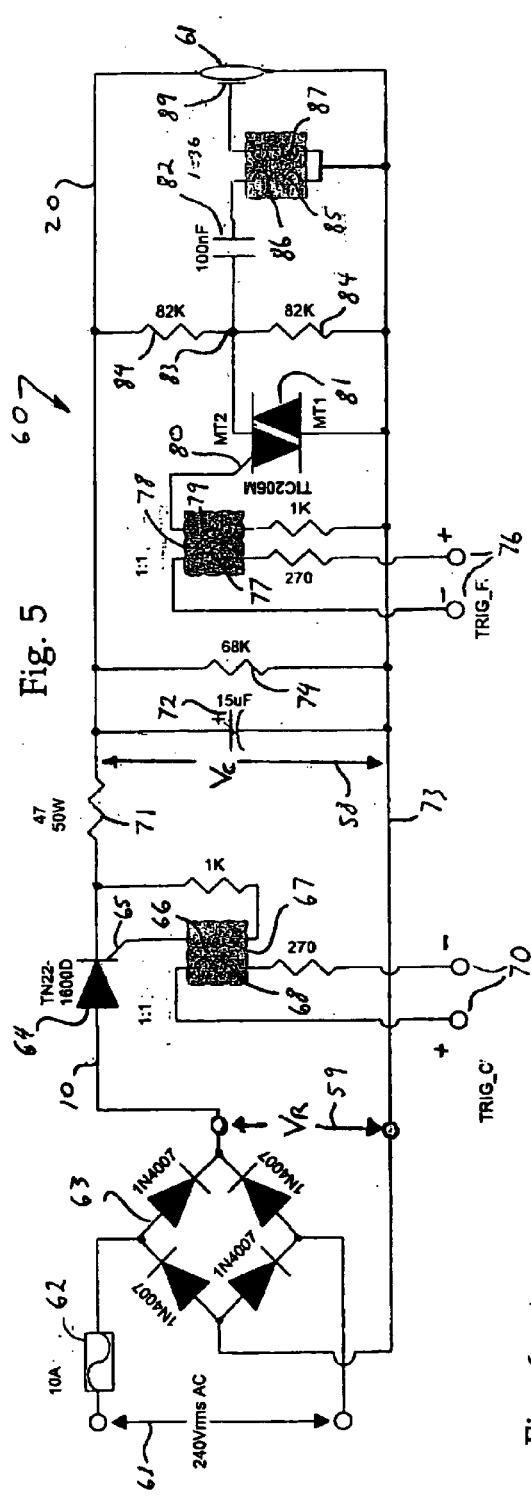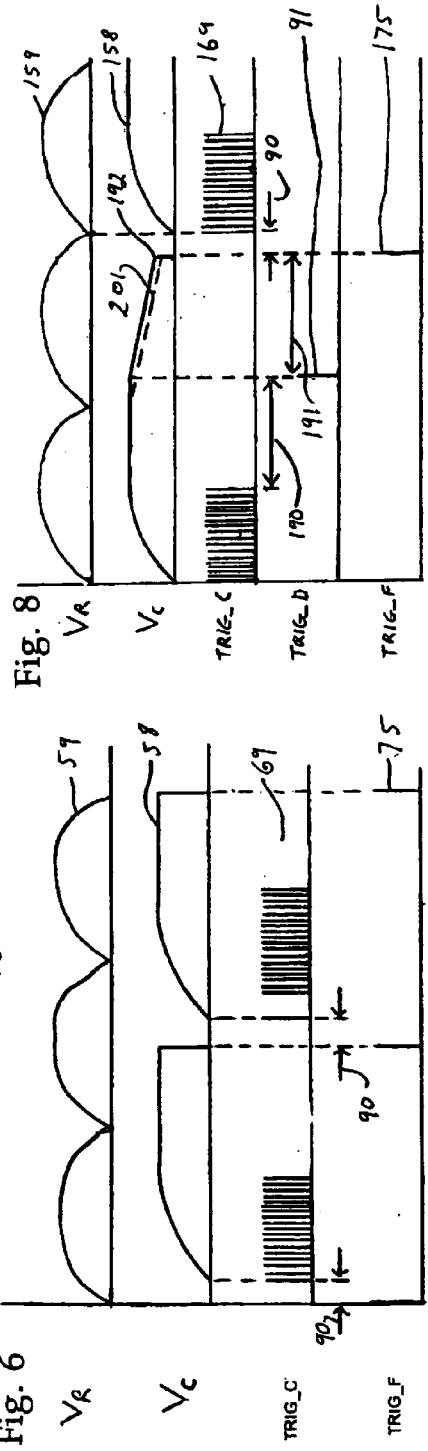

STROBE FLASH PHOTOGRAPHIC ILLUMINATION

BACKGROUND OF THE INVENTION

The present invention relates to a camera with strobe flash illumination for capturing an image of an object, and to a document scanning system and method of using such a camera to capture an image of a document.

In recent years, document scanners have become commonplace. Although these work well and are relatively inexpensive, a document scanner occupies a significant amount of scarce desk space.

The use of a camera to take a photograph of a document consisting of text and/or images offers one way of dealing with the problem of wasted desk space. In conventional film or electronic photography, a person may look through a viewfinder to aim the camera at an object. When the object is a document, for example a document lying on a desk in an office illuminated by ambient light from windows and overhead lighting, it will usually be necessary to use an additional source of light, such as a conventional electronic flash synchronised with a mechanical shutter or electronic capture of the image. Often a person has to stand up, lean over the document, and then take the photograph, in which case, the person's body may block ambient light, thereby requiring the use of a flash even if the ambient light is bright.

Such a flash reduces exposure time and therefore helps to reduce or substantially eliminate camera shake or other relative movement between the camera and an object in an object plane of the camera, particularly when the camera is hand-held. A flash also provides light with a known colour temperature to produce an image that is a true colour. When a photograph is to be taken of an object with a shiny or glossy surface, then ambient light can at certain angles be reflected from the surface and overwhelm the image of the document itself. In this case, a flash can provide sufficient illumination to overcome such stray reflections so that the document can be correctly imaged.

Although conventional flash units are effective in dealing with these problems, a bright flash of light from such a unit can be startling or annoying to anyone nearby. Even if a person is partially shielded directly from such a flash, for example by an office cubical, the eye is very sensitive to any sudden flicker of light. For this reason it is generally considered unacceptable to use conventional flash illumination in many environments, particularly in an office environment, where others could be disturbed by a flash.

Digital camera products are becoming common in many areas of still and motion photography, and as a result are becoming ever less expensive. However such cameras are still used almost exclusively for photography of people or places, and have yet to be adapted for use in office imaging applications. One reason for this is that most electronic cameras, which normally employ two dimensional CCD arrays, have insufficient resolution to image a complete A4 size page at 300 dots per inch, the minimum that is conventionally believed necessary for reasonably high quality reproduction. Whilst higher resolution CCDs are available in electronic cameras, they are much too expensive for a mass-market office imaging product.

As a result cameras with flash attachments and electronic cameras are not widely used in place of document scanners in an office environment.

SUMMARY OF THE INVENTION

It is an object of the present invention to provide a convenient and relatively unobtrusive camera with flash illumination, document scanning system and method of using such a camera to capture an image of a document.

Accordingly, the invention provides a camera, comprising an image capture means, an objective lens with a field of view to image optical radiation from an object plane onto the image capture means, a strobe flash for illuminating the object plane, electronic pulse circuitry to pulse the strobe flash at a rate which is sufficiently quick that the illumination flash appears to a user of the camera to be substantially steady owing to persistence of vision, and a shutter means to synchronise the capture of one or more images by the image capture means, each image being captured with at least one pulse from the strobe flash, characterised in that the shutter means is adapted to capture images at a rate substantially below the rate at which the strobe flash is pulsed.

Because the pulsed strobe flash appears to be a continuous light, the illumination can be much less obtrusive than a single flash synchronised with the shutter means. The illumination can be no more distracting than a person turning a light such as a desk lamp on, and then off.

The image capture means may be photographic film or at least one electronic detector array, for example a two dimensional CCD array. In most applications, it is preferred if the image capture means is a detector array, owing to the greater sensitivity at low light levels. This permits a reduction in strobe flash energy compared with that needed with many types of photographic film.

The shutter means may be a mechanical shutter in the case of photographic film. If a detector array is used, then there is no need for a mechanical shutter, and circuitry on or associated with the detector array can be used to capture and then to gate out an electronic signal representative of light levels on the detector array.

An electronic "shutter" has, of course, no moving parts and so a detector array may in principle be capable of collecting data representative of images at a rate comparable with the strobe flash rate. The invention is concerned with still photography rather than motion photography. Even if an electronic camera were capable of collecting data relating to a number of still images in quick succession, in still photography there is no need or desire to keep such surplus or transitory images, and so the number of images actually used will be substantially less than the number of strobe flashes. The term "captured" as used herein therefore relates to captured images that are more than just transitorily captured, but which may be used or kept as in still photography.

The perception of steady illumination can be achieved if the pulse rate of the strobe flash is at least 50 Hz. Some conventional still cameras, even those with mechanical shutters, are capable of taking up to about five still photographs per second. One definition an image capture rate substantially below the strobe flash rate would therefore be that the strobe flash rate is at least ten times higher than the image capture rate.

In many applications, however, just one image will need to be captured. For the illumination to be unobtrusive, it is preferable if the illumination is steady for at least about one second. For strobe pulses of at least 50 Hz, it is therefore preferred if the strobe flash rate is at least 50 times higher than the image capture rate.

The illumination can be made less intrusive if the pulse circuitry is arranged to ramp up the perceived intensity of the steady illumination prior to the capture of the image, and/or to ramp down said intensity after capture of the image. In terms of human perception of the intrusiveness of the illumination, the ramp up in intensity gives a greater benefit than the ramp down in intensity, but most preferably the illumination is ramped both up and down in intensity.

Preferably, the ramp up and/or ramp down of the perceived intensity of the steady illumination takes place over at least 0.25 second.

Therefore, the camera may include means by which the illumination may be dimmed. Such means may include an electrical energy storage circuit that stores charge up to maximum limit. Circuitry may then be provided that controllably discharges at least some of the stored energy prior to a flash lamp pulse.

Often it will be desirable to conserve electrical power, for example if the camera electronic circuitry is powered by a rechargeable battery. This will place a limit on the duration of the steady illumination, and also on the length of time for any ramp up/down in illumination. Preferably, the ramp up and/or ramp down of the perceived intensity of the steady illumination takes place over less than one second.

When the image capture means is an electronic detector array, the shutter means may comprise electronic control circuitry to synchronise the capture of an image by the detector array with the strobe flash.

In document imaging applications, it is preferred to use inexpensive detector arrays. These, however, have insufficient resolution to capture an A4 page at 300 dpi.

Therefore, the camera may include an actuator to scan the field of view of the objective lens in the object plane as the control circuitry captures images of different fields of view. In this case, the strobe flash may be used to effectively freeze any relative motion between the object plane and the camera. Therefore, there is no need for the actuator to stop motion when an image is to be captured, and so the actuator may scan the field of view of the objective lens continuously, i.e. without stopping, as the control circuitry captures images of different fields of view. This simplifies the control of the actuator and allows a more rapid capture of several images one after the other.

The camera may be a hand-held camera, in which case the strobe flash will help to reduce or eliminate the effect of any camera shake.

However, the preferred embodiment of the invention relates to a document scanning system comprising a camera with an actuator as described above, and with a mount by which the camera may be positioned to image onto the detector a portion of a document in the object plane. The mount may be a stand that rests on or that can be affixed to a work surface such as an office desk.

The actuator is then operable to scan the field of view of the objective lens as the control circuitry captures images of different portions of the document. This permits a relatively low resolution but inexpensive detector array to be used to build up a composite image of a document. Therefore, the system may comprise means by which images captured from adjacent or overlapping fields of view can be joined into a composite image of the adjacent or overlapping fields.

Also according to the invention, there is provided a method of imaging a document using a camera with an actuator as described above, characterised in that the method comprises the steps of:

a) aiming the camera at a document in the object plane so that a portion of the document falls within the field of view; and b) using the actuator to scan the field of view of the objective lens as the control circuitry captures images of different portions of the document.

Furthermore, the invention provides a method of scanning a document using a document scanning system, using a camera with an actuator and a mount as described above, characterised in that the method comprises the steps of:

c) mounting the camera to image onto the detector a portion of a document in the object plane; and d) using the actuator to scan the field of view of the objective lens as the control circuitry captures images of different portions of the document.

BRIEF DESCRIPTION OF THE DRAWINGS

The invention will now be further described by way of example only, and with reference to the accompanying drawings, in which:

FIG. 5 is a diagram of a circuit for pulsing the strobe flash lamp with a constant illumination;

FIG. 6 is a plot of waveforms in the circuit diagram of FIG. 6;

FIG. 8 is a plot of waveforms in the circuit of FIG. 7.

DETAILED DESCRIPTION

Figure 1:
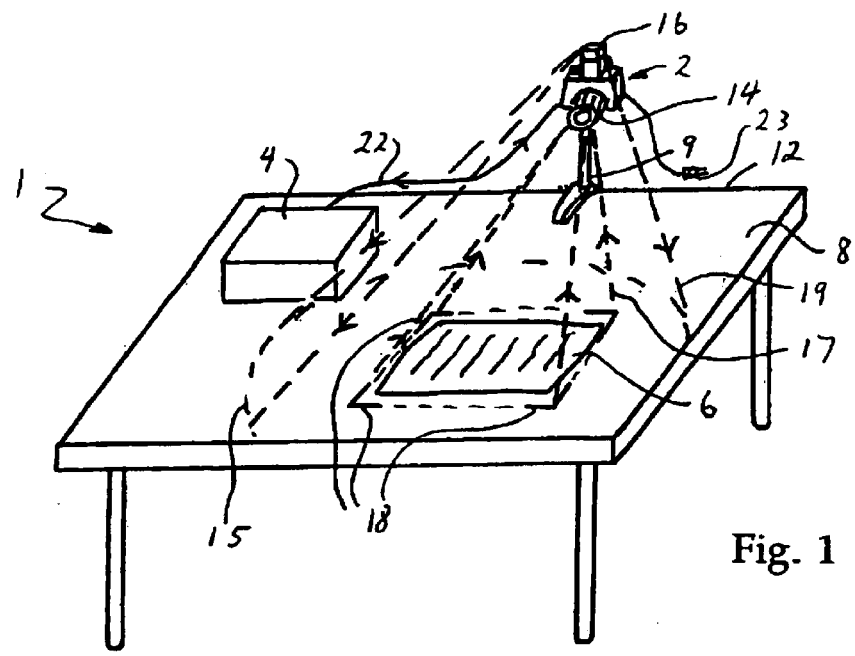
FIG. 1 is a perspective view of a camera and a document imaging system according to the first embodiment of the invention.

FIG. 1 shows a document imaging system 1 according to a first embodiment of the invention, comprising a camera 2 and a camera controller unit 4 that are arranged to image a document 6 lying on a work surface 8. The camera may be hand-held, but for convenience is mounted atop a post 9 affixed to an edge 12 of the work surface 8. The document will typically be an A5, A4 or A3 size document, for example a sheet of printed paper, an open book, or a photograph.

Figure 3:
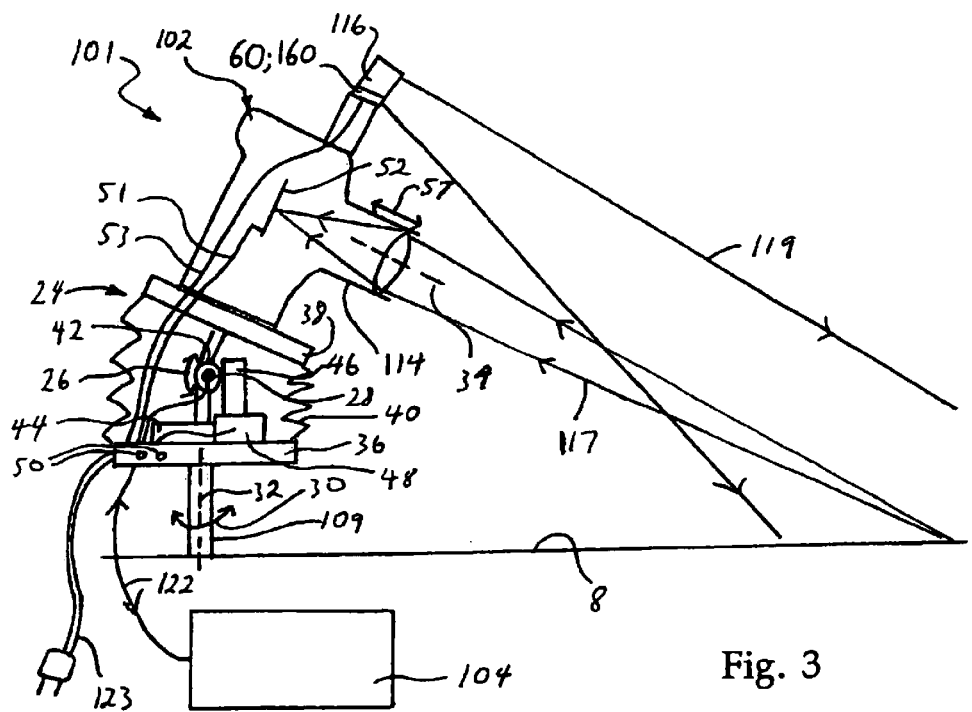
FIG. 3 is a schematic view in cross-section of the camera and document imaging system of FIG. 2.

The camera comprises an objective lens 14 and a strobe flash unit 16, both of which are directed at the document 6. The lens 14 has a field of view 18 sufficiently wide so that the lens can receive optical radiation 17 to image the entire document 6 all at once. The strobe flash unit projects visible light 19 over an area 15 sufficiently wide that the document is uniformly illuminated. As will be explained in more detail below, the camera includes an image capture means, preferably an electronic detector (see FIG. 3 reference numeral 52) and the strobe flash unit 16 is pulsed at a rate sufficiently quickly that to the human eye the illumination appears to be steady.

During one pulse of the strobe flash, the detector 52 captures an image of the document and sends an electronic signal comprising data representative of the image along a multicore connecting cable 22 to the camera controller unit 4.

Optionally, the camera may illuminate the document with more than one pulse if the light levels on the image capture means are too low, in order to build up an acceptable exposure. Multiple strobe flashes may also be useful if a lower aperture is needed for increased depth of field.

The camera 2 and strobe flash unit 16 may be powered either by a rechargeable battery (not shown) or from mains electricity via a lead 23.

Figure 2:
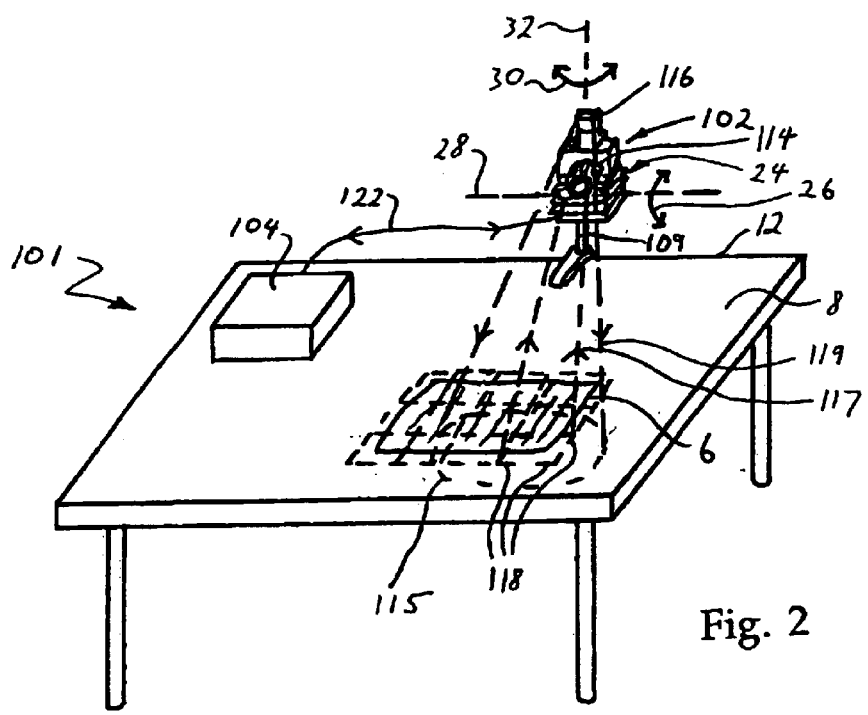
FIG. 2 is a perspective view of a camera and a document imaging system according to a second embodiment of the invention.
Figure 4:
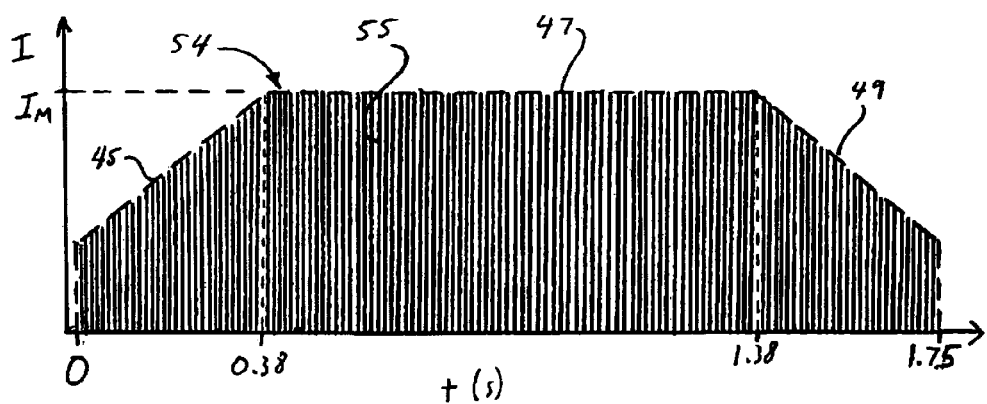
FIG. 4 is a plot of intensity from a strobe flash lamp unit for a camera according to the invention, showing a ramp up in intensity followed by a constant intensity and then a ramp down in intensity.

FIGS. 2 and 4 show a second embodiment of the invention 101, in which identical features are labelled as in FIG. 1, and similar features are labelled with reference numerals incremented by 100.

The camera 102 differs from the first embodiment in that the lens field of view 118 and illuminated area 115 are narrower, and able to image only about one-twelfth of the document 6. An actuator 24 is therefore provided between the camera 102 and the post 110.

The actuator 24 has two degrees of freedom of motion 26, 30, one of which 26 is about a horizontal axis 28, and the other of which 30 is about a vertical axis 32. The horizontal axis is roughly transverse to an optical axis 34 of the lens 114. The degrees of freedom of motion 26, 30 permit the camera 102 to be moved so that the strobe flash unit 116 and lens 114 can respectively illuminate and image successively the all areas of the document 6. The degrees of freedom of motion 26, 30 need not be orthogonal, but in general it will be convenient if this is so.

The actuator has a lower plate 36 and an upper plate 38, the lower plate being affixed atop the post 110, and the upper plate being affixed to the camera 102. The camera may be either permanently attached to the actuator 24, or the camera may be removably attached, particularly if the camera 102 is removably attached to the actuator 24 and may be used separately from the actuator 24 as a hand-held camera.

A flexible bellows 40 extends between the lower plate 36 and upper plate 38. Concealed within the bellows is a horizontal axis pivot mechanism 42 and a vertical axis pivot mechanism 44, each of which may be driven by a small electrical motor 46, 48. The maximum tilt afforded by the horizontal axis pivot mechanism 42 is about ±30° and the maximum pan afforded by the vertical axis pivot mechanism 44 is about ±45°.

The controller 4, 104 may be a dedicated controller, but is preferably a personal computer with a controller card and software for controlling the camera 2, 102, and in the case of the second embodiment 101, also the movement of the actuator 24.

Optionally, the actuator 24 may have manual controls 50 by which the tilt and pan may be set. For example, the manual controls 50 may be used to centre roughly the camera 102 on the document 6 to be imaged, prior to automatic control of pan and tilt by the controller 104.

In addition to controlling the orientation of the camera 102, the controller 104 acts as a shutter means to gate out from a two-dimensional detector array 52 data representative of an image on the array 52. This data is passed to the controller 104 via the multicore cable 122 and an electrical connection 51 through the actuator 24 and camera 102. The controller also controls via the multicore cable 122 and an electrical connection 53 through the actuator 24 and camera 102, the timing, and optionally also the intensity, of light pulses from the strobe flash unit 116.

In general, the camera 2, 102 will have a lens 14, 114 which can be focussed 57, either manually or automatically, with a depth of field sufficient to image an object, such an a document presented at an oblique angle to the optical axis 34 of the camera. In this sense, an object to be imaged is in the "object plane" if it is within the depth of focus of the lens.

Reference is now made to FIG. 4. As mentioned above, the rate of which the strobe flash unit generates pulses 55 of light is sufficiently high that the illumination 19, 119 appears to the human eye to be steady. In practice, the pulse rate should be at least about 50 Hz. Above 100 Hz, flicker cannot be perceived, and so there is no benefit to the perception of steady illumination, whilst the intensity of each pulse of light is decreased.

In both embodiments 1, 101 of the invention, the strobe flash unit 16, 116 is pulsed 55 at a rate that may lie between 50 Hz and 75 Hz at an intensity within an envelope 54 that ramps up 45 from about 40% of a maximum intensity $I_M$ to the maximum intensity $I_M$ over 0.38 second, is then constant 47 at intensity $I_M$ for one second, and then ramps down 49 to about 40% of the maximum intensity $I_M$ over a further 0.38 second. Ideally, the ramps would extend smoothly close to zero illumination. In practice, this is difficult to achieve with a flash lamp, which will need some minimum voltage to operate. The ramps 45, 49 nevertheless serve the effect of making any stray light from the strobe less obtrusive.

Optionally, the frequency of the flash lamp pulses may rise from a relatively low rate as the flash lamp pulse intensity increases and/or fall from a relatively high rate as the flash lamp pulse intensity decreases. This will enhance the perception that the flash lamp average power is being ramped smoothly from and/or to zero average intensity.

During at least one of the pulses 55 when the intensity is constant, the camera 2, 102 captures an image of at least a portion of the document 6.

In the case of the second embodiment, 101, the phase of constant illumination 47 may be extended to about 10 seconds to give the camera time to pan and tilt over the whole document 6, and to capture and transmit to the control unit 104 a number of images. Software in the control unit is then used to identify matching features in adjacent imaged areas 118 so that each image can be joined into a composite image of the document 6.

Electronic circuitry for driving the strobe flash unit 16, 116 is preferably housed within the flash unit 16, 116 and will now be described in detail with reference to FIGS. 5, 6 and 7. FIG. 5 shows circuitry 60 which produces a constant pulsed illumination from a strobe lamp 61, for example of the type sold by EG&G Heimann Optoelectronics GmbH as part number DGS 5903. This strobe lamp 61 has a Xenon flash tube capable of producing a pulsed flash of visible light with a pulse width of less than 80 $\mu$s with an energy of about 1 J per pulse and at a repetition rate of at least 50 Hz. In the case of providing illumination sufficient to overcome reflected in glare on a glossy document, it is preferred if the pulse width is 20 $\mu$s to 30 $\mu$s. This level of illumination is adequate for detector arrays, but if the camera has photographic film, then a higher pulse energy may be needed, depending on the sensitivity of the film.

At 1 J per pulse and at a repetition rate of 75 Hz, the average power output of the strobe flash unit is 75 W, which is not so high so that any stray light will inevitably be distracting. At this power level, stray light will be perceived in the same way as a bright desk lamp being switched on, and then off again after an appreciable, but short time.

The circuit 60 receives 50 Hz ac mains power 200 at 240 volts rms. A 10 amp anti-surge fuse 62 protects a full wave rectifier 63 that supplies rectified voltage pulses 59 ($V_R$) at 100 Hz, as shown in FIG. 6, to an input power rail connected to an input power rail 10 connected to the anode of a thyristor 64. The thyristor has a gate 65 wired to a secondary winding 66 of an isolating signal transformer 67. The secondary is in a 1:1 turns ratio with a primary winding 68 connected to a signal input TRIG_C. FIG. 6 shows schematically a series of thirty trigger charge pulses 69 that can be applied to an input TRIG_C 70 in order to gate the thyristor 64. The trigger charge pulses each have a width of 10 µs and a period of 100 µs and last for 3 ms, which is sufficiently long for the thyristor 64 to be put in conductive mode during one rising half cycle of the rectified voltage. The trigger charge pulses may be generated by the computer 4, 104 and supplied to the circuitry 60 along cable 22, 122.

The thyristor 64 therefore acts as a "charge gate" and the thyristor gate 65 and transformer 67 act as a "charge trigger" to the thyristor 64.

When the thyristor 64 is gated, current flows from the thyristor anode via a 47 Ω, 50 W current limit power resistor 71 to an output power rail 20 to charge up a 15 µF storage capacitor 72 connected to a common line 73 from one side of the full wave rectifier 63. The current builds up a charge voltage 58 ($V_C$) across the charge capacitor 72.

Because the series of trigger charge pulses 69 lasts for a duration of greater than one half cycle of the humps of the rectified voltage $V_R$ 59, the trigger charge pulses will always extend over a rising minimum of the rectified voltage 59. Once the thyristor 64 becomes conductive, it stays conductive until the charging voltage difference across the thyristor drops below about 5 V, close to the peak in the rectified voltage, which will be about 350 V.

Therefore, the start of trigger charge pulses 69 need not be synchronised with a zero crossing of the ac power input 200. The current limit resistor 71 limits the maximum current that can be supplied by the thyristor 64 in order to protect the thyristor from the otherwise very high currents that would flow if charging is started near a peak of the rectified power input 59.

Current stored in the storage capacitor 72 is used following a trigger flash pulse 75 to pulse the flash lamp 61. A 68 kΩ bleed resistor 74 is wired in parallel with the storage capacitor 72 so that the storage capacitor 72 can discharge over a few seconds in the event that the flash lamp 61 is not triggered to pulse.

The trigger flash pulse 75 is applied via a signal input TRIG_F 76 to a primary winding 77 of 1:1 turns ratio signal transformer 78. A secondary winding 79 of the transformer 78 has one end of the winding wired through a 1 kΩ resistor and the other end of the winding wired to a gate 80 of a triac 81.

When the triac 81 is gated by a trigger flash pulse 75, current suddenly flows from a 100 nF capacitor 82 connected to a node 83 held at half the charge voltage 58 between a pair of 82 kΩ resistors 84 connected across the charging capacitor 72. This current is pulled through a primary winding 85 of a signal transformer 86, which acts as a trigger coil for the flash lamp 61. One end of a secondary winding 87 of this signal transformer 86 is connected via the common line 73 to one end of the flash lamp 61. The other end of the secondary is wired to a glass envelope 89 of the flash lamp 61. The primary and secondary windings 85, 87 have a 1:36 turns ratio. Because of this, and the very limited current that may flow in the secondary winding 87 owing to the connection to the non-conducting flash lamp envelope 89, the voltage across the secondary winding, and hence on the flash tube glass envelope rises to about 4000 volts. This high voltage triggers a break down in the Xenon gas inside the flash lamp 61, which then flashes with a pulse of light lasting about 30 µs, as the charging capacitor 72 discharges.

The triac 81 and transformer 86 therefore act as a "flash gate", and the triac gate 80 and transformer 78 act as a "flash trigger" to the triac 81 and transformer 86.

The operation of the circuit 60 can be appreciated with reference to FIG. 6. The charge cycle is not synchronised with the mains cycle. First, there is a delay 90 between the trigger flash pulse 75 and a following trigger charge pulse 69 to allow the flash lamp 61 to quench, during which the impedance of the flash lamp 61 rises as ionised Xenon atoms recombine. Closely spaced trigger charge pulses 69 allow the charging capacitor 72 to charge when the rectified voltage $V_R$ 59 exceeds the charge voltage $V_C$ 58. The time constant presented by the current limit resistor 71 and charging capacitor 72 is less than 1 ms, sufficiently small that the charging capacitor can be fully charged in one cycle (i.e. one hump) of the rectified voltage $V_R$ 59. As the rectified humps occur at 100 Hz while the flash lamp pulses occur at 75 Hz, there are 1.5 humps per flash lamp pulse, which is more than adequate to charge fully the charge capacitor 72 whether or not the charge cycle is synchronised with the mains cycle.

Figure 7:
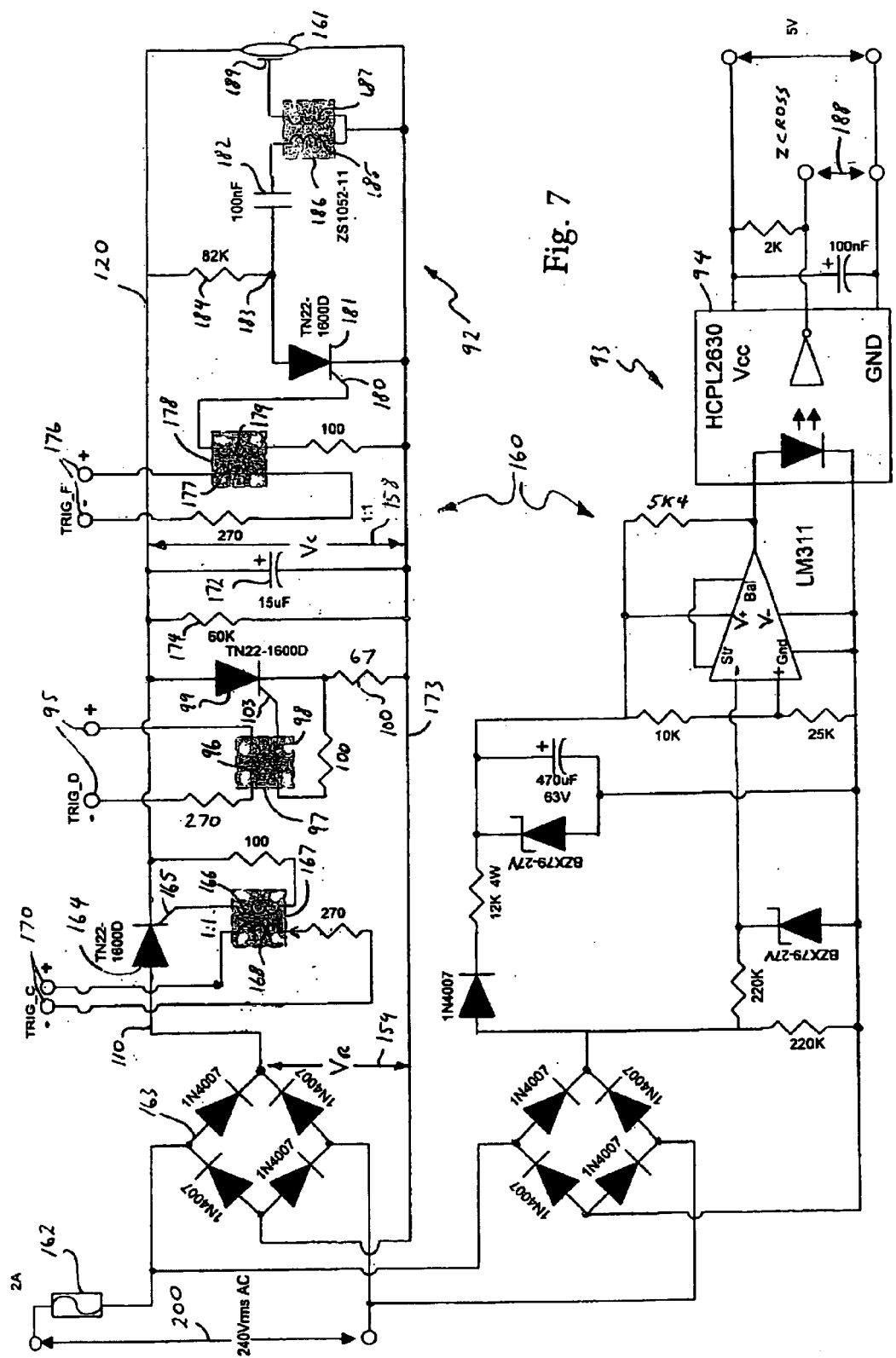
FIG. 7 is a diagram of a circuit for pulsing the strobe flash with a constant or a variable intensity.

FIG. 7 shows a second circuit 160 that is capable of dimmably controlling the flash lamp pulses. Components in an upper portion 92 of the circuit which perform a similar function to those in the circuit 60 of FIG. 5 are labelled with reference numerals incremented by 100.

There are two main differences between the circuit diagram upper portion 92 and the circuit of FIG. 5. First, there is no current limit resistor to limit current from the anode of the thyristor 164. This eliminates a relatively expensive component, and also improves overall efficiency of the circuit 160. In order to avoid high initial charging currents, charging of the charge capacitor 172 is synchronised with the mains cycle so that charging begins when the rectified voltage 159 is zero or close to zero and rising. The circuit diagram lower portion 93 therefore consists of a conventional zero crossing detector, the operation of which will be apparent to those skilled in the art, and which will therefore not be further described. The zero-crossing circuit 93 has an opto-isolator 94 that provides as an output a zero crossing signal ZCROSS 188. The zero crossing signal is fed along the connecting cable 22, 122 to the computer 4, 104 which then generates a series of thirty trigger charge pulses 169, as shown schematically in FIG. 8 which are then applied to the trigger charge input 170. The thirty charge pulses each have a width of 10 µs and a period of 100 µs, which is sufficient for the thyristor 164 to be made conductive during the initial rise of rectified voltage $V_R$. The thyristor then stays conductive until the charging voltage difference across the thyristor drops below about 5 V, close to the peak in the rectified voltage, which will be about 350 V.

The second main difference is that the circuit upper portion 92 has a trigger discharge input TRIG_D 95 that receives from the computer 4, 104 one trigger discharge pulse 91 of 10 µs duration. The trigger discharge input 95 is wired to the primary coil 96 of a signal transformer 97. The secondary coil 98 is wired to the gate 103 of a "discharge" thyristor 99. The discharge thyristor anode is connected in series with a 67 Ω bleed resistor 100. The thyristor 99 and bleed resistor 100 are connected in parallel across the charging capacitor 172, so that when the thyristor 99 is gated by the trigger discharge pulse 91, current stored in the charging capacitor 172 is discharged. Since the trigger discharge pulse 91 comes after the charging capacitor 172 has reached its full voltage of about 350 V, there is no need for additional trigger discharge pulses to make the discharge thyristor 99 conductive. Once the discharge thyristor 99 is made conductive, it will stay conductive until the charging capacitor 172 is fully discharged.

Therefore, as shown in FIG. 8, the energy stored in the charging capacitor 172 can be reduced after the charging of the capacitor 172 has reached its full value by waiting for an appropriate period of time 190, then applying a trigger discharge pulse 91 to the trigger discharge input 95 so that after a further period of time 191, the charge voltage $V_C$ 158 has declined to a lower value 192.

This reduction in stored energy is proportional to the amount of time that energy is bled off before the flash lamp 161 is fired. If the interval that energy is bled off is monotonically reduced over the course of multiple flashes, one would perceive a gradual increase in brightness. By holding this bleed interval steady or not triggering this bleed circuit at all for multiple flashes, the illumination will be perceived as steady. By then gradually increasing the bleed interval, the illumination brightness could then be ramped down. The resistance of the bleed resistor 100 may be chosen so that it is possible to substantially discharge the charging capacitor 172 before the next trigger flash pulse 175, as indicated by dashed line 201. In the present example, the flash lamp 161 is a custom Xenon flash lamp that can operate at between 225 V and 350 V. The energy stored in the charging capacitor 172 is given by $\frac{1}{2}CV^2$, so that the intensity of the flash lamp flashes can reduced to about 40% of the maximum intensity.

Thus, by applying a trigger discharge pulse 91 to the trigger discharge input 95, the energy stored in the charging capacitor 172 can be controlled in order to dim by a constant amount, or to ramp up or ramp down the intensity or the flash lamp 161, as illustrated in FIG. 4.

In the circuit 160, the synchronisation of charging with the mains frequency and the need for a bleed interval 191 results in a flash lamp pulse rate that is the same as the mains frequency, here 50 Hz.

The circuitry 60 of FIG. 5 and the strobe flash pulse generation circuitry 92 of FIG. 7 are preferably closely combined with the strobe flash unit 16, 116 owing to the high currents supplied to the flash lamp 61, 161. Circuitry for generating the low voltage control signals TRIG_C, TRIG_D and TRIG_F is preferably part of a separate controller unit, such as the computer 4, 104.

The invention therefore provides a convenient and relatively unobtrusive camera, particularly an electronic camera, a document scanning system and a method of using a camera to capture an image of a document. In the first embodiment of the invention 1, a document image can be captured all at once, at a resolution defined by the number of pixels on a detector array. If a 300 dpi resolution is required across an A4 page, then the detector may require 8 million pixels. A lower resolution and cheaper detector array, for example a conventional video camera detector array with VGA resolution, can be used to achieve the same image resolution if the document imaging system includes an actuator and controller by which a plurality of adjoining images may be captured, and then combined to give a composite image of the document.

The steady strobe flash illumination is unobtrusive, and allows correct colour balance to be achieved, and well as reducing or substantially eliminating the effect of glare from a document with a glossy surface.

What is claimed is:

1. A camera comprising a detector for image capture, an objective lens with a field of view to image optical radiation from an object plane onto the detector for image capture, a strobe flash for illuminating the object plane, electronic pulse circuitry to pulse the strobe flash at a rate which is sufficiently quick that the illumination appears to a user of the camera to be substantially steady owing to persistence of vision, and a shutter arrangement to synchronize the capture of one or more images by the detector for image capture, each image being captured with at least one pulse from the strobe flash, wherein the shutter arrangement is adapted to capture images at a rate substantially below the rate at which the strobe flash is pulsed.

2. A camera as claimed in claim 1, in which the pulse circuitry is arranged to ramp up the perceived intensity of the steady illumination prior to the capture of the image, and/or to ramp down said intensity after capture of the image.

3. A camera as claimed in claim 2, in which the ramp up and/or ramp down of the perceived intensity of the steady illumination takes place over at least 0.25 second.

4. A camera as claimed in claim 2, in which the ramp up and/or ramp down of the perceived intensity of the steady illumination takes place over less than 1 second.

5. A camera as claimed in claim 1, in which the rate at which the strobe flash is pulsed is at least 50 Hz.

6. A camera as claimed in claim 1, in which the rate at which the strobe flash is pulsed is at least 10 times higher than the image capture rate.

7. A camera as claimed in claim 1, in which the detector for image capture is an electronic detector array, the shutter arrangement comprising electronic control circuitry to synchronize the capture of an image by the detector array with the strobe flash.

8. A camera as claimed in claim 7, in which the camera includes an actuator to scan the field of view of the objective lens in the object plane as the control circuitry captures images of different fields of view.

9. A camera as claimed in claim 8, in which the actuator scans the field of view of the objective lens continuously as the control circuitry captures images of different fields of view.

10. A camera as claimed in claim 1, in which the camera is a hand-held camera.

11. A document scanning system comprising a camera, the camera comprising an electronic detector array for image capture, an objective lens with a field of view to image optical radiation from an object plane onto the electronic detector array, a strobe flash for illuminating the object plane, electronic pulse circuitry to pulse the strobe flash at a rate which is sufficiently quick that the illumination appears to a user of the camera to be substantially steady owing to persistence of vision, and a shutter arrangement comprising electronic control circuitry to synchronize the capture of an image by the detector array with the strobe flash, each image being captured with at least one pulse from the strobe flash, wherein the shutter arrangement is adapted to capture images at a rate substantially below the rate at which the strobe flash is pulsed, the camera further including an actuator to scan the field of view of the objective lens in the object plane as the control circuitry captures images of different fields of view; the document scanning system further comprising a mount by which the camera may be positioned to image onto the electronic detector array a portion of a document in the object plane, wherein the actuator is operable to scan the field of view of the objective lens as the control circuitry captures images of different portions of the document.

12. A document imaging system as claimed in claim 11, in which the system comprises a processor adapted to execute a stitching algorithm by which images captured from adjacent or overlapping fields of view can be joined into a composite image of the adjacent or overlapping fields.

13. A method of imaging a document using a camera comprising an electronic detector array for image capture, an objective lens with a field of view to image optical radiation from an object plane onto the electronic detector array, a strobe flash for illuminating the object plane, electronic pulse circuitry to pulse the strobe flash at a rate which is sufficiently quick that the illumination appears to a user of the camera to be substantially steady owing to persistence of vision, and a shutter arrangement comprising electronic control circuitry to synchronize the capture of an image by the detector array with the strobe flash, each image being captured with at least one pulse from the strobe flash, wherein the shutter arrangement is adapted to capture images at a rate substantially below the rate at which the strobe flash is pulsed, the camera further including an actuator to scan the field of view of the objective lens in the object plane as the control circuitry captures images of different fields of view, wherein the method comprises the steps of:

(a) aiming the camera at a document in the object plane so that a portion of the document falls within the field of view; and (b) using the actuator to scan the field of view of the objective lens as the control circuitry captures images of different portions of the document.

14. A method of scanning a document using a document scanning system, the document scanning system comprising a camera, the camera comprising an electronic detector array for image capture, an objective lens with a field of view to image optical radiation from an object plane onto the electronic detector array, a strobe flash for illuminating the object plane, electronic pulse circuitry to pulse the strobe flash at a rate which is sufficiently quick that the illumination appears to a user of the camera to be substantially steady owing to persistence of vision, and a shutter arrangement comprising electronic control circuitry to synchronize the capture of an image by the detector array with the strobe flash, each image being captured with at least one pulse from the strobe flash, wherein the shutter arrangement is adapted to capture images at a rate substantially below the rate at which the strobe flash is pulsed, the camera further including an actuator to scan the field of view of the objective lens in the object plane as the control circuitry captures images of different fields of view; the document scanning system further comprising a mount by which the camera may be positioned to image onto the electronic detector array a portion of a document in the object plane, wherein the actuator is operable to scan the field of view of the objective lens as the control circuitry captures images of different portions of the document, wherein the method comprises the steps of:

(a) mounting the camera to image onto the detector the segment of the document in the object plane; and (b) using the actuator to scan the field of view of the objective lens as the control circuitry captures images of different portions of the document.

15. A method of scanning a document as claimed in claim 14, wherein the document scanning system further comprises a processor adapted to execute a stitching algorithm by which images captured from adjacent or overlapping fields of view can be joined into a composite image of the adjacent or overlapping fields, in which the method comprises after step b) the step of:

(c) joining images captured from adjacent or overlapping fields of view into a composite image of the document.

16. A camera comprising a detector for image capture, an objective lens with a field of view to image optical radiation from an object plane onto the detector for image capture, a strobe flash for illuminating the object plane, electronic pulse circuitry to pulse the strobe flash at a rate of at least 16 times/second, and a shutter arrangement to synchronize the capture of one or more images by the detector for image capture, each image being captured with at least one pulse from the strobe flash, wherein the shutter arrangement is adapted to capture images at a rate substantially below the rate at which the strobe flash is pulsed.

17. A document scanning system comprising a camera, the camera comprising an electronic detector array for image capture, an objective lens with a field of view to image optical radiation from an object plane onto the electronic detector array, a strobe flash for illuminating the object plane, electronic pulse circuitry to pulse the strobe flash at a rate of at least 16 times/second, and a shutter arrangement comprising electronic control circuitry to synchronize the capture of an image by the detector array with the strobe flash, each image being captured with at least one pulse from the strobe flash, wherein the shutter arrangement is adapted to capture images at a rate substantially below the rate at which the strobe flash is pulsed, the camera further including an actuator to scan the field of view of the objective lens in the object plane as the control circuitry captures images of different fields of view; the document scanning system further comprising a mount by which the camera may be positioned to image onto the electronic detector array a portion of a document in the object plane, wherein the actuator is operable to scan the field of view of the objective lens as the control circuitry captures images of different portions of the document.

18. A method of imaging a document using a camera comprising an electronic detector array for image capture, an objective lens with a field of view to image optical radiation from an object plane onto the electronic detector array, a strobe flash for illuminating the object plane, electronic pulse circuitry to pulse the strobe flash at a rate of at least 16 times/second, and a shutter arrangement comprising electronic control circuitry to synchronize the capture of an image by the detector array with the strobe flash, each image being captured with at least one pulse from the strobe flash, wherein the shutter arrangement is adapted to capture images at a rate substantially below the rate at which the strobe flash is pulsed, the camera further including an actuator to scan the field of view of the objective lens in the object plane as the control circuitry captures images of different fields of view, wherein the method comprises the steps of:

(a) aiming the camera at a document in the object plane so that a portion of the document falls within the field of view; and (b) using the actuator to scan the field of view of the objective lens as the control circuitry captures images of different portions of the document.

* * * * *